(12) United States Patent
De Maziere et al.

(10) Patent No.: US 11,913,544 B2
(45) Date of Patent: Feb. 27, 2024

(54) METHOD FOR CONTROLLING A CONTINUOUSLY VARIABLE TRANSMISSION AND A TRANSMISSION EQUIPPED WITH A CONTROL SYSTEM FOR IMPLEMENTING SAID METHOD

(71) Applicant: MAZARO N.V., Destelbergen (BE)

(72) Inventors: Filip De Maziere, Destelbergen (BE); Lucas Present, Putte (BE)

(73) Assignee: MAZARO N.V., Destelbergen (BE)

( * ) Notice: Subject to any disclaimer, the term of this patent is extended or adjusted under 35 U.S.C. 154(b) by 0 days.

(21) Appl. No.: 17/907,568

(22) PCT Filed: Mar. 30, 2020

(86) PCT No.: PCT/EP2020/058952
§ 371 (c)(1),
(2) Date: Sep. 28, 2022

(87) PCT Pub. No.: WO2021/197568
PCT Pub. Date: Oct. 7, 2021

(65) Prior Publication Data
US 2023/0141770 A1    May 11, 2023

(51) Int. Cl.
*F16H 15/52* (2006.01)
*F16H 61/664* (2006.01)

(52) U.S. Cl.
CPC ........... *F16H 61/664* (2013.01); *F16H 15/52* (2013.01); *F16H 61/6645* (2013.01); *F16H 2061/6641* (2013.01)

(58) Field of Classification Search
CPC .. F16H 61/664; F16H 15/52; F16H 2061/664; F16H 15/38; F16H 61/6645; B60W 10/108; B60W 10/109

(Continued)

(56) References Cited

U.S. PATENT DOCUMENTS 5,980,421 A * 11/1999 Machida .............. F16H 61/664
                                                                 476/2
9,709,168 B2    7/2017 De Maziere

FOREIGN PATENT DOCUMENTS

| EP | 1054193 A1 * | 11/2000 | ............. F16H 15/38 |
| WO | 2009146748 A1 | 12/2009 | |
| WO | 2017174106 A1 | 10/2017 | |

OTHER PUBLICATIONS

International Search Report and Written Opinion of the International Searching Authority from the European Patent Office, in PCT/EP2020/058952 dated Jun. 5, 2020, which is an international application corresponding to this U.S. application.

* cited by examiner

*Primary Examiner* — Roger L Pang
(74) *Attorney, Agent, or Firm* — Kolitch Romano Dascenzo Gates LLC (57) ABSTRACT

A method is disclosed for controlling a drill-free curve-CVT including a ring wheel, a set of planet wheels, and a sun wheel, wherein the ring and sun wheel are clamped together. The normal forces between the ring and sun wheel on the one hand and the planet wheels on the other hand are well defined when the transmission ratio is constant. The normal forces for constant ratio are called the static values. The method is configured so that during a continuous increase or decrease of the transmission ratio, any force component added to the static values of the first and/or the second normal force is either zero or smaller than a predefined force component to maintain a microslip condition of the rolling contacts between the planet wheels and the ring and sun wheels. This control of the forces is applied regardless of the speed of the ratio change.

14 Claims, 4 Drawing Sheets

(58) Field of Classification Search
USPC .............................. 475/114, 115; 477/37, 50
See application file for complete search history.

METHOD FOR CONTROLLING A CONTINUOUSLY VARIABLE TRANSMISSION AND A TRANSMISSION EQUIPPED WITH A CONTROL SYSTEM FOR IMPLEMENTING SAID METHOD

The project leading to this application has received funding from the European Union's Horizon 2020 research and innovation program under grant agreement No. 768386.

FIELD

The present disclosure is related to variable transmissions for driving road vehicles, off-road vehicles, agricultural machinery, or for driving auxiliaries in vehicles as well as industrial components such as generators and compressors in stationary or mobile equipment.

INTRODUCTION

Figure 1:
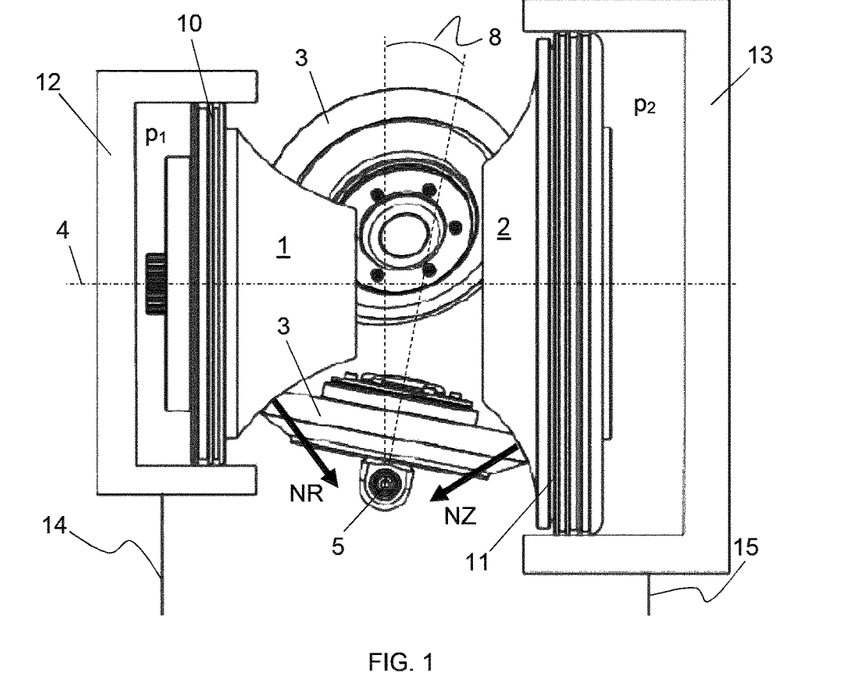
FIG. 1 illustrates the normal forces acting on the traction wheels of a drill-free curve-CVT when the transmission is operating at a constant transmission ratio.
Figure 2:
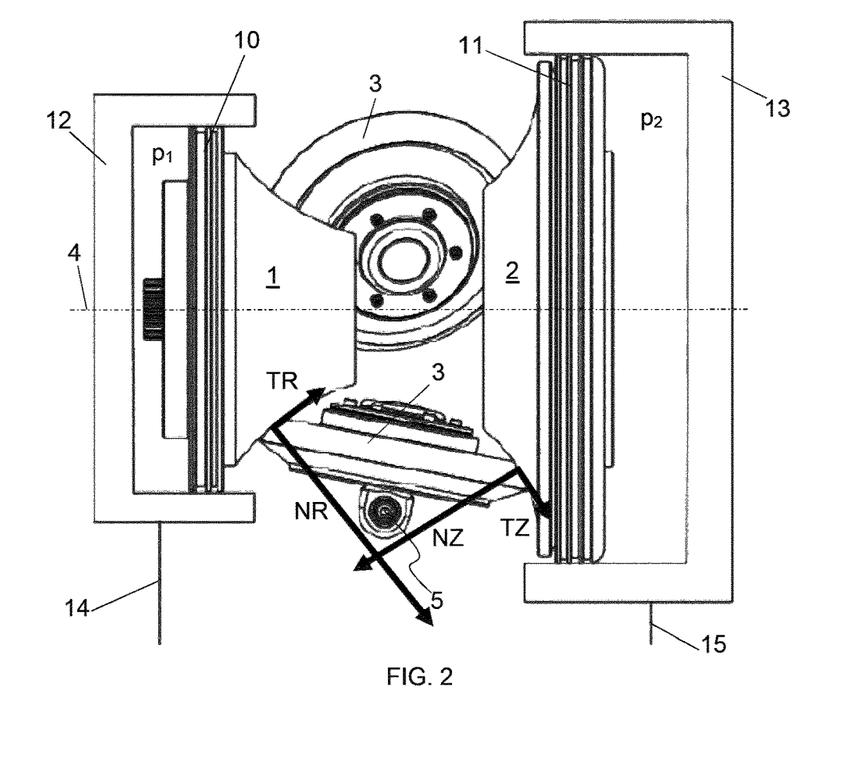
FIG. 2 illustrates the forces applied by prior art control systems when the transmission ratio changes at a given speed of the ratio change.

The curve-CVT is a type of continuously variable transmission that includes one or more variators as shown in FIGS. 1 and 2, comprising a ring wheel 1, one or more planet wheels 3 and a sun wheel 2. The planet wheels 3 are mounted so as to be freely pivotable about respective hinges 5 with respect to a common support ring (not shown) which is in the shown embodiment connected to a transmission housing (not shown). The ring wheel 1 and the sun wheel are rotatable about a common central axis 4.

The ring, sun, and planet wheels are called traction wheels and are configured to transmit the rotation of an input shaft (not shown) connected to the ring wheel 1, to the rotation of an output shaft (not shown) connected to the sun wheel 2.

In order to transmit torque by traction between the ring wheel 1 and the planet wheels 3 and between the planet wheels 3 and the sun wheel 2, a minimum clamping force NR and NZ respectively are required. These forces are acting perpendicularly on the tangent plane in the contact point 6 between the ring wheel 1 and the planet wheel 3 and on the tangent plane in the contact point 7 between the planet wheel 3 and the sun wheel 2 respectively. By applying a driving torque on the ring wheel 1, the sun wheel 2 will be driven with a certain ratio depending on the inclination angle 8 between the planet wheel's rotational axis and the normal on the common rotational axis 4 of the ring wheel 1 and sun wheel 2. The torques on the ring wheel 1 and the sun wheel 2 induce traction forces in points 6 and 7 respectively. These traction forces are oriented perpendicularly on the plane of the figure.

This type of curve-CVT is traditionally controlled by a control system that ensures maintaining microslip at any steady-state working condition of the transmission in terms of the speed of the input shaft, the transmitted torque and the transmission ratio. In other words, the control system applies predefined values of the forces NR and NZ as a function of the above working conditions: when the transmission operates at a given input speed and torque and at a given constant ratio, predefined forces NR and NZ are applied which ensure that rolling within microslip takes place. As these forces are defined when the ratio is constant, they are hereafter referred to as static clamping forces.

With reference to FIG. 2: when the transmission is transmitting power and its ratio is increasing or decreasing, the inclination angle 8 is varying which induces also transverse forces TR and TZ acting perpendicularly on the traction forces and on the clamping forces in the contact points 6 and 7. When the transmission ratio is changing, the traction wheels are forced to roll over a changing rolling diameter, inducing a transverse slip in the rolling contacts. By this transverse slip, the rolling traction wheels slip perpendicularly on the rolling direction. The transverse slip is parallel to the forces TR and TZ shown in FIG. 2, while the longitudinal slip is oriented perpendicularly on the plane of the cross section.

In order to maintain the microslip conditions during the change of the transmission ratio, the presently known control systems increase the static clamping forces NR and NZ by a dynamic force component during the ratio change. This is illustrated in FIG. 2 which shows the effect of a fast ratio change on the forces. It is seen that the normal forces NR and NZ are higher than the static values. The dynamic force component depends on the speed of the ratio change. In other words, during a change of the ratio, higher clamping forces are applied compared to the static clamping forces applicable for a constant ratio. The dynamic clamping force is only a small percentage of the static clamping force for slow and medium speeds of ratio change but the dynamic clamping force becomes significant for very fast ratio changes. Even though such very fast changes occur rarely, the mechanical construction and the controls must be designed for it anyway as a very fast ratio change can be requested also at maximum torque capacity of the transmission.

The most common control systems applied for controlling a curve-CVT use hydraulic power. In the embodiment shown in FIG. 1, a stationary cylinder 12 with a hydraulic piston 10 inside it is pushing over a thrust bearing (not shown) against the ring wheel 1 and in a similar way another piston 11 in a stationary cylinder 13 is pushing against the sun wheel 2 so that both pistons push the traction wheels together under the influence of the hydraulic pressures p1 and p2. The pistons are movable axially under the influence of a hydraulic fluid flowing through supply lines 14 and 15. By means of these two pistons the transmission can be fully controlled: the clamping forces and the inclination angle can be controlled independently. The connection of the input and output shafts to the ring wheel and sun wheel respectively is not shown in detail in the drawings. This connection can for example be realized by a sliding spline connection, known as such in the state of the art and therefore not described here in detail.

A ratio change is realized by shifting the pistons axially, which is done by actuating a controlled flow into one cylinder and simultaneously out of the other cylinder, while controlling the pressures p1 and p2 continuously throughout the ratio change. The control can be realized through one or more control loops, involving pressure sensors and/or a displacement sensor, so that the contact forces NR and NZ are controlled at multiple instants throughout the ratio change, according to predefined target values. The contact forces NR and NZ are controlled based on an algorithm implemented in the control system and known as such, that takes into account the transmitted torque, the speeds of the shafts and the speed of the ratio change.

The more torque is transmitted, the higher the pressure on the hydraulic pistons 10 and 11. The construction of the transmission parts and the hydraulic components must be made strong enough to withstand these pressures. A pressure increase due to the dynamic clamping forces is therefore a disadvantage, especially during fast ratio changes.

The pressure control is generally realized by a pump driven directly by the vehicle engine or by an electric motor. The pump pressure is regulated to a fixed or a variable pressure so that the pressure is at least as high as the maximum of all hydraulic actuation requirements. The pressure to each actuation piston is regulated by a proportional pressure reducing valve, controlled by an electric solenoid. When the volume in an actuation cylinder 12 or 13 increases, the solenoid feeds flow in this cylinder, by consuming hydraulic power from the pump. When the oil volume in an actuation cylinder decreases, the solenoid drains the oil to the transmission sump, by dissipating the energy. Solenoid-operated valves however cause a significant pressure drop when they feed or drain a high flow, which needs to be compensated by ensuring a higher pump pressure. The pressure drop renders the solenoid-operated control systems particularly inefficient in terms of delivering the dynamic clamping forces required by the above-described control method, especially in the event of fast ratio changes. Solenoids are also vulnerable to dirt in the hydraulic oil. Small dirt particles can cause a sticking solenoid so that the real pressure does not match the requested pressure. Also, the solenoids are mounted in a hydraulic block, that requires precise and expensive machining.

SUMMARY

The present disclosure is related to a control method for a continuously variable transmission (CVT) that utilizes drill-free rolling of a set of planet wheels on the surfaces of a ring wheel and a sun wheel, the rolling surfaces of which are designed according to a specific curve that enables the drill-free rolling. In the present description, the term 'curve-CVT' will be applied for this particular type of transmission. Drill-free rolling means that there is only a tiny microslip in the torque-transmitting rolling contacts of the traction wheels. Documents WO2009/146748A1 and WO2017/174106 show examples of this type of transmission.

The present disclosure aims to control a drill-free curve-CVT without requiring excessive pressure increases during fast ratio changes. This aim is achieved by the method for controlling a curve-CVT disclosed herein, and by a curve-CVT including a control system in accordance with the present teachings. The method of the present disclosure is a method for controlling a drill-free curve-CVT comprising a ring wheel, a set of planet wheels and a sun wheel, wherein the ring, planet and sun wheel are clamped together. The normal forces for constant ratio are called the static values of the normal forces. As in prior art curve-CVTs, the static values of the normal forces between the ring and sun wheel on the one hand and the planet wheels on the other hand are well defined when the transmission ratio is constant, i.e. when the pivot angle of the planet wheels is constant. The method is configured so that during a continuous increase or decrease of the transmission ratio, any force component added to the static values of the first and/or the second normal force is either zero or smaller than a predefined force component that is required to maintain a microslip condition of the rolling contacts between the planet wheels and the ring and sun wheels. This control of the forces is applied regardless of the speed of the ratio change.

The present disclosure is in particular related to a method for controlling a continuously variable transmission comprising an input shaft and an output shaft being rotatably arranged about a common central rotation axis, a ring wheel and a sun wheel being coaxially arranged with respect to the central axis, and at least one set of pivotable planet wheels, the pivot angle of the planet wheels determining the transmission ratio of the transmission, wherein:

the transmission operates through drill-free rolling of the planet wheels on the surfaces of the ring wheel and the sun wheel, independently of the pivot angle of the planet wheels, the ring wheel, planet wheels and the sun wheel are clamped together so that the ring wheel exerts a first normal force (NR) on any given planet wheel and the sun wheel exerts a second normal force (NZ) on said planet wheel, the method is configured to control said first and second normal forces (NR,NZ), so that, when the transmission operates at a given input speed, a given transmitted torque, and a given constant transmission ratio, a predefined static value of the first and second normal force is applied, and a condition of microslip is applicable to the rolling contacts between the planet wheels and the ring and sun wheel, characterized in that:

during a continuous increase or decrease of the pivot angle and thereby of the transmission ratio, any force component added to the static values of the first and/or the second normal force is either zero or smaller than a predefined force component that is required to maintain the microslip condition.

According to an embodiment, during the increase or decrease of the transmission ratio, one of the normal forces is maintained at the static value while the other is controlled in order to overcome tangential reaction forces generated by the change of the pivot angle.

According to an embodiment, the ring wheel and the sun wheel are clamped together under the direct or indirect influence of a first and second hydraulic pressure.

Said hydraulic pressures may act directly on respective hydraulic pistons, configured to move axially in the direction of the central axis, and wherein the ring wheel and the sun wheel are fixed to the respective pistons.

The present disclosure is equally related to a continuously variable transmission comprising an input shaft and an output shaft being rotatably arranged about a common central rotation axis, one or more sets of a ring wheel, a sun wheel being coaxially arranged with respect to the central axis and a set of pivotable planet wheels, the pivot angle of the planet wheels determining the transmission ratio of the transmission, wherein the transmission operates through drill-free rolling of the planet wheels on the surfaces of the ring wheel and the sun wheel, independently of the pivot angle of the planet wheels, wherein the ring wheel and the sun wheel are clamped together so that the ring wheel exerts a first normal force (NR) on any given planet wheel and the sun wheel exerts a second normal force (NZ) on said planet wheel, characterized in that the transmission comprises a control system configured to control the transmission in accordance with the method of the present disclosure.

According to an embodiment, said control system is a hydraulic control system. In the latter case, the transmission may be regulated by a first and second hydraulic pressure realized in a first and second hydraulic cylinder by a hydraulic fluid, said pressures acting to clamp the ring wheel and the sun wheel together.

According to an embodiment, the first and second pressure are acting directly on respective first and second pistons which are movable inside said respective first and second cylinders.

Said control system may comprise a first and second motor/pump assembly, each assembly comprising a hydraulic pump coupled to an electric motor, said assemblies being configured to control said first and second pressures in the respective cylinders.

According to an embodiment, the output port of the pump of one motor-pump assembly is connected to the input port of the pump of the other motor-pump assembly.

According to an embodiment, the pumps of the motor-pump assemblies can act as hydraulic motors, and wherein the electric motors of the motor-pump assemblies can act as generators.

DETAILED DESCRIPTION

FIG. 1 illustrates the above-described basic components of a drill-free curve-CVT as known from WO2017/174106, and controlled by hydraulic pressures p1 and p2 acting via a piston and a thrust bearing on the ring wheel 1 and the sun wheel 2 respectively. Other alternatives are possible, wherein the ring wheel 1 or the sun wheel 2 is stationary and the structure to which the hinges 5 are coupled, either a central shaft or a circumferential ring, is axially movable. The present disclosure is applicable also to these embodiments. However, the present disclosure will be explained based on the embodiment shown in FIG. 1, in which the ring 1 and the sun wheel 2 are rotatable and axially displaceable, and wherein the hinges 5 are stationary.

As stated in the introduction, FIG. 1 shows the normal forces NR and NZ when the transmission is operating at a constant transmission ratio. These clamping forces NR and NZ are the 'normal' forces in the sense that they are acting perpendicularly on the tangent plane in the contact point 6 between the ring wheel 1 and the planet wheel 3 and on the tangent plane in the contact point 7 between the planet wheel 3 and the sun wheel 2. By applying a driving torque on the ring wheel 1, the sun wheel 2 is driven with a certain ratio depending on the inclination angle 8 of the planet wheels 3. The torques on the ring wheel 1 and the sun wheel 2 induce traction forces in the contact points 6 and 7. These traction forces are oriented perpendicularly on the plane of the drawing. As the transmission operates without drill slip, there is only a tiny microslip in the torque transmitting rolling contacts of the traction wheels. Typically such a microslip is between 0.1 and 0.3%. Due to the traction forces, this microslip is a tangential slip, thus slipping occurs parallel with the rolling direction.

In the scientific literature about contact mechanics of rolling bodies, microslip is described as follows: two three-dimensional bodies roll over each other and are loaded by a normal force in their contact point so that the bodies are elastically deformed and a contact area is created. When traction is exerted between the two bodies, the slip between the bodies is called microslip as long as the contact area comprises a zone where the material points of the two bodies stick to one another. In the remainder of the contact area the surfaces slip over each other due to elastic deformation of the bodies. When the zone of sticking disappears (due to high traction or low normal force) the slip is no longer in microslip but becomes macroslip. In the present description, the above-described scientific meaning of 'microslip' and 'macroslip' is applicable. Sometimes the same terminology is applied about belt-operated continuously variable transmissions (belt CVTs) where no rolling contacts are present. Any documentation on belt-CVTs that refers to microslip and/or macroslip is therefore not relevant for the present patent application.

As stated in the introduction and illustrated in FIG. 2, the current control strategy for drill-free curve-CVTs is to keep the rolling always within microslip throughout the ratio change, by applying a dynamic force component that is dependent on the speed of the ratio change, and that can become very high at fast ratio changes, leading to high pressure increases in the cylinders 12 and 13. This may lead to reduced efficiency, especially when the control system is equipped with solenoid-operated control valves.

Figure 3:
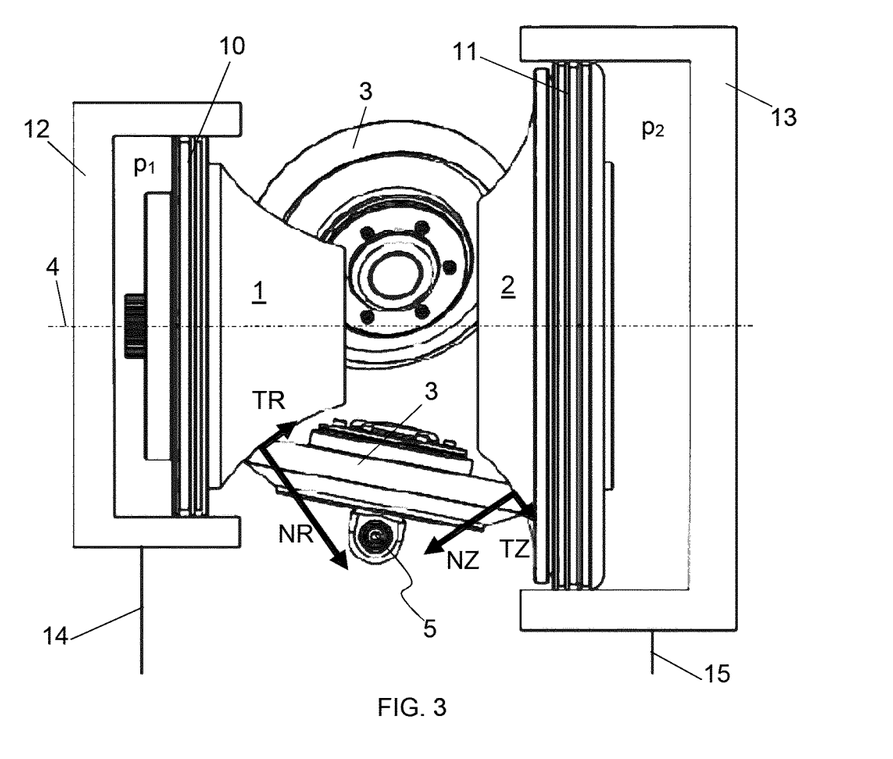
FIG. 3 gives an example of the forces applied in accordance with the method of the present disclosure when the transmission ratio changes at a comparable speed as in the case of FIG. 2.

The inventors have found from theoretical and practical research that the dynamic force during ratio changes is not required to ensure optimal operation of the drill-free curve-CVT. The method of the present disclosure is based on this counterintuitive finding. According to the method of the present disclosure, no microslip-maintaining dynamic force component is added to the static values of NR and NZ, during a continuous increase or decrease of the ratio. With 'microslip-maintaining dynamic force component' is meant, a force component that depends on the speed of the ratio change and that is configured to maintain the microslip condition during the ratio change. According to a preferred embodiment, the static clamping force for one of the normal forces NR or NZ (which one of the two depends on the direction in which the ratio is changing) is applied throughout the ratio change, regardless of the speed of the change. This is illustrated in FIG. 3, showing an example of the forces applied in reaction to the same (fast) ratio change illustrated in FIG. 2. Whereas in the prior art control method, NR and NZ increased considerably, NZ stays the same in FIG. 3, while NR only slightly increases in order to overcome the reaction forces TR and TZ generated by pivoting around the hinge.

So both NR and NZ continue to be controlled at their static values during the ratio change, with only a small correction on one of the two in order to overcome the reaction forces TR and TZ, and thereby maintain the instantaneous moment around the hinge 5 equal to zero during the ratio change. The static value itself can change during the ratio change. What is important however is that according to the preferred embodiment, no dynamic component configured to maintain the microslip condition is added to either NR or NZ.

In the case of the transmission disclosed WO2009/146748A1, the hinge axis intersects with the central rotation axis, which means that the reaction forces TR and TZ pass through the hinge axis, generating no moment about this axis, so that these reaction forces do not need to be compensated. So in this case, the normal forces NR and NZ can be maintained at their static values throughout the ratio change, i.e. the added force component is zero on both sides.

Whereas in prior art systems, a fast change of the ratio generates an important increase of the forces compared to the static force values due to the always positive dynamic force component required to maintain microslip, the method of the preferred embodiment of the present disclosure does not add this particular dynamic component to the static values (forces smaller than this particular component could be added, see further). When the ratio change is slow, this dynamic component is not significant, and the forces applied by embodiments of the method of the present disclosure are not much different from the prior art method. However when the ratio changes fast, the forces applied by the method of the present disclosure can be considerably lower than in the prior art method. This means that when the ratio changes very fast, no high pressures need to be applied in the cylinders 12 and 13 and in the supply lines 14 and 15 towards these cylinders.

According to some embodiments, a force component smaller than the 'component configured to maintain the microslip condition' could be added to the forces NR and NZ during the ratio change, while preferably the force equilibrium about the hinge is maintained throughout the change, i.e. the instantaneous moment around the hinge is maintained at zero. Dynamic force components required to maintain microslip are well-known from the prior art methods described above, so the present disclosure is clearly defined: when any force component is added to the static values of NR and/or NZ during a ratio change, this force component must be either zero or smaller than the forces required to maintain microslip. The present disclosure can be explained also in a purely mathematical way. According to the prior art, the minimum required values during a ratio change for the clamping forces NR and NZ are a function of input speed, input torque, transmission ratio and speed of the ratio variation. According to the present disclosure the minimum values for the forces NR and NZ are a function of input speed, input torque (or equivalently, output speed and output torque) and transmission ratio for zero speed of ratio change. Therefore, for every non-zero speed of ratio variation, the minimum value for NR and NZ in the current disclosure is always lower than in the prior art—in equal conditions of input speed, input torque and transmission ratio—because the dynamic forces applied in the prior art methods are always positive.

Figure 4:
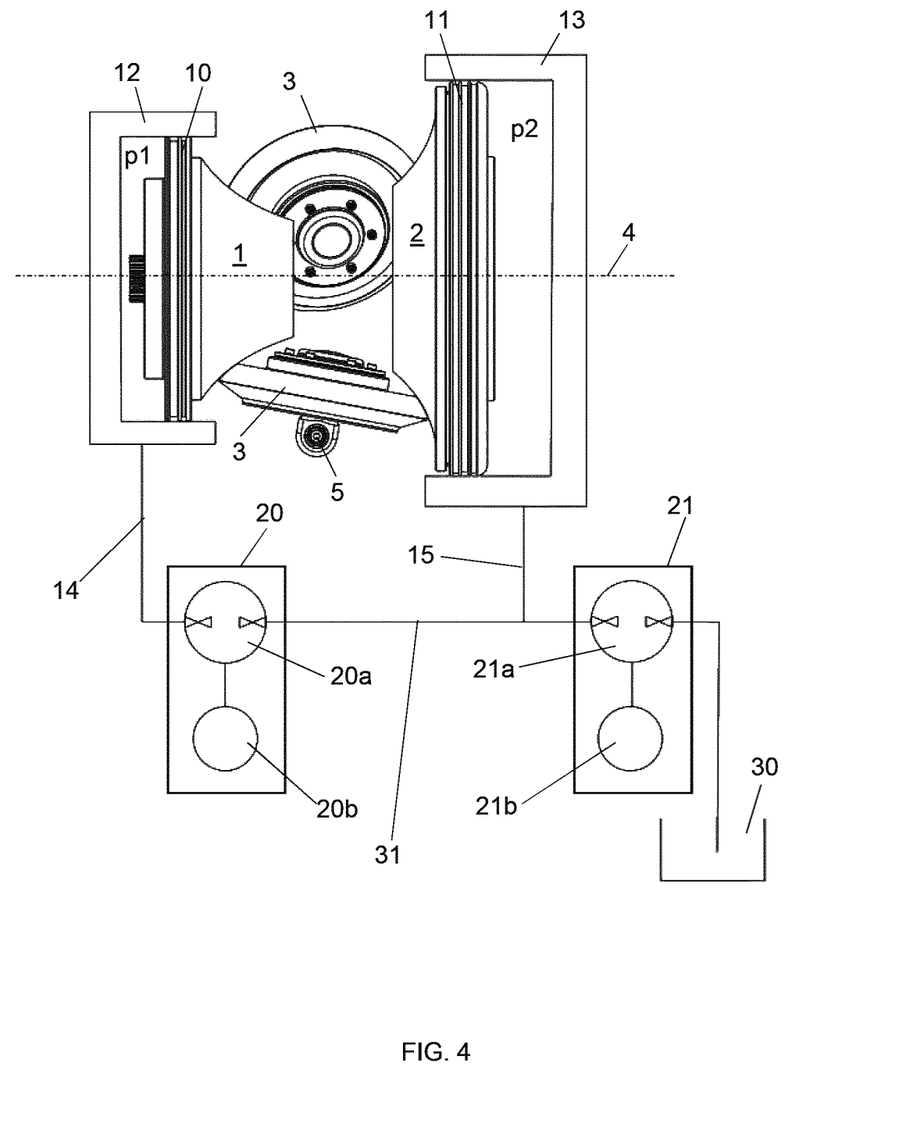
FIG. 4 shows a hydraulic control system for controlling a drill-free curve-CVT in accordance with a preferred embodiment of the present disclosure.

The present disclosure is also related to a curve-CVT equipped with a control system capable of implementing the method of the present disclosure. This may be any suitable control system capable of controlling the forces NR and NZ in accordance with the method, i.e. by applying the static forces during any ratio change, regardless of its speed. A preferred embodiment of a hydraulic control system suitable for realizing the above method is illustrated in FIG. 4. The pressures p1 and p2 are supplied by two motor-pump assemblies 20 and 21, each assembly comprising a hydraulic pump 20a/21a that can also act as a hydraulic motor and, rotatably coupled thereto, an electric motor 20b/21b that can also act as a generator. The electric motors 20b/21b of the motor-pump assemblies are powered through a suitable power source, which may be the battery of a vehicle in which the transmission is installed. The pumps 20a and 21a are connected in such a way that the pump 21a that delivers p2 is coupled between a hydraulic liquid sump 30 and the input port of the pump 20a that delivers p1. In other words, there is a connection 31 between the output port of pump 21a and the input port of pump 20a.

The system is operated through a control algorithm that controls the forces in accordance with the method of the present disclosure. From the design and dimensions of the transmission, the static forces NR, TR, NZ, TZ are defined for every combination of torque, speed, and for every constant ratio. By vectorial summation of NR and TR, the required pressure on piston 10 is calculated. In a similar way the pressure on piston 11 is calculated from the forces NZ and TZ. When the characteristics of the motor-pump assembly are known, the required electric current to the electric motors of the motor-pump assemblies is defined. During the ratio change, the algorithm does not add a dynamic force component to these static values, that is configured to maintain the microslip condition. According to the preferred embodiment, one of the forces NR and NZ is maintained at the static value, while the other is controlled to overcome the reaction forces TR and TZ generated by pivoting around the hinge when the ratio is changing.

Closed loop control during the ratio change can be realized by a pressure sensor in the cylinder at the sun wheel side or at the ring wheel side, possibly in combination with a position sensor on the piston at the ring wheel side, the sun wheel side or by measuring the speeds of output and input shaft. Any closed loop control in terms of sensors and controllers known in the art for regulating a ratio change while maintaining microslip can also be used in a system according to the present disclosure. The difference is in the forces as such: whereas both NR and NZ increase by a dynamic component when microslip needs to be maintained, this increase of both these forces is not required according to the method of the present disclosure, at least not as a function of the speed of the ratio change.

The above described control by pumps fully eliminates the solenoids so that all pressure drops and robustness issues from solenoids are overcome, regardless the velocity of ratio change. In addition, the control system shown in FIG. 4, using motor-pump assemblies 20 and 21 coupled in the above-described manner by the connection 31, saves a lot of hydraulic energy.

When the transmission ratio is changing, one cylinder is being filled up, while the other one is draining. Both flows are not equal because of the special geometry of the ring wheel and sun wheel rolling surfaces, but the difference in flow between the filling and the draining flow is only a small fraction of each of these flows. In practice, this differential flow is only about 10 to 25% of the flow to one of the cylinders.

The motor-pump assembly 21 must provide the pressure p2 in the corresponding cylinder 13 but it only has to supply the small differential flow. So it has to be sized for only the correspondingly smaller power instead of the full hydraulic power for this cylinder alone.

The pressures p1 and p2 are regulated in accordance with the required forces NR, TR, NZ and TZ. Generally, pressures p1 and p2 are not equal and their relation depends on the transmission ratio and other parameters. However, the difference between both pressures is only a small fraction of the pressure itself. Pump 20a must supply the full flow to cylinder 12 but only over the pressure difference between the two cylinders. So also the motor-pump assembly 20 can be sized for a fraction of the power—some 10 to 25%—that would be needed to supply cylinder 12 alone.

In the arrangement of FIG. 4, both motor-pump assemblies 20 and 21 have thus to supply only about 10 to 25% of the power that would be needed if both cylinders would be supplied individually. Moreover, changing the transmission ratio in one direction may consume energy, while changing the ratio in the other direction will recover energy thanks to the fact that the pumps may act as hydraulic motors and the electric motors may act as generators. Considering the efficiencies of the pumps, the motors, and the friction of the piston seals, the net energy consumption is only about 40%-60% of the supplied energy without energy recovery.

Combining the lower power needs with the energy recovery, the control system shown in FIG. 4 consumes only about 5 to 15% of energy compared to an optimized system with solenoids. In addition, the control system of FIG. 4 completely eliminates a hydraulic block.

The control system shown in FIG. 4 therefore constitutes a preferred embodiment of a control system suitable for implementing the method of the present disclosure.

Figure 5:
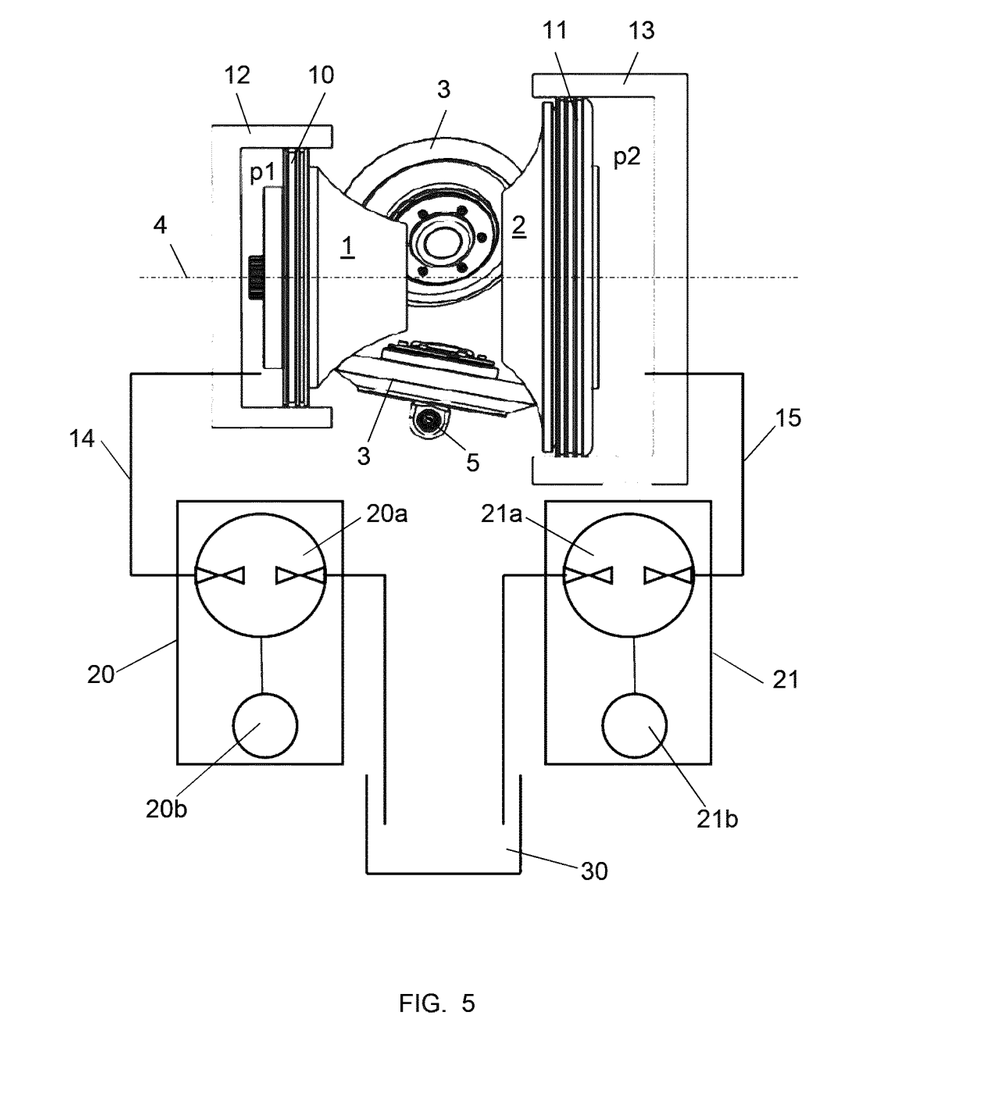
FIG. 5 shows a hydraulic control system for controlling a drill-free curve-CVT in accordance with an alternative embodiment of the present disclosure

Nevertheless, the method according to the present disclosure may be implemented also by other hydraulic control systems. The system of FIG. 5 for example comprises again two motor-pump assemblies 20 and 21 but now there is no direct connection between the two. This means that both motor-pump assemblies 20 and 21 need to be able to provide the full flow and pressure required in the two cylinders. This configuration is therefore less efficient in terms of the power consumption of the motor-pump assemblies. Other hydraulic control configurations may be imagined by the skilled person, which are slightly different from the systems of FIGS. 4 and 5, but which are suitable for implementing the method of the present disclosure. All these variants fall within the scope of the present disclosure.

In the motor-pump assemblies shown in FIGS. 3 and 4, it is not essential that the pumps 20a/21a can act as a hydraulic motor and that the electric motors 20b/21b can act as a generator. If these capabilities are not present, energy recuperation is not possible, but the system is still suitable for implementing the method of the present disclosure.

The method of the present disclosure may equally be implemented by a hydraulic control system as presently known in the art, using solenoids, possibly combined with a flow amplifier, otherwise the pressure drop caused by the solenoids makes it unlikely to change the flow towards the cylinders sufficiently fast. Even when using flow amplifiers, very fast ratio changes generate pressure drops. Using the control systems that utilize motor-pump assemblies however, as in the embodiments shown in FIGS. 4 and 5, this problem of pressure loss does not occur, which is why these systems are particularly suitable for implementing the method of the present disclosure. These systems are capable of implementing any speed of the ratio change that can be expected to occur practically without pressure drops.

Finally, control systems which do not use hydraulic power may also be suitable for implementing the method of the present disclosure, such as control systems using mechanical springs, pneumatic pistons or electro-mechanical actuators to realize the required clamping forces.

As stated earlier, the present disclosure is not limited to a curve CVT wherein the ring wheel and the sun wheel are axially movable and directly actuated, such as by the pressures p1 and p2 in the embodiments shown in the drawings. In a transmission wherein for example the ring wheel is stationary and the planet wheels and the sun wheel are actuated directly by external forces, the forces NR, TR and NZ, TZ are a known function of these external forces and may be implemented as such in the control algorithm, and may thus be controlled also in accordance with the method of the present disclosure.

The present disclosure is applicable also to a Reversible Variable Transmission (RVT) as described in WO 2009/146748 (Appl. No. PCT/EP2008/057009), which comprises two sets of planet wheels mounted between a primary ring wheel and a secondary sun wheel and with an intermediate wheel in between the two sets. This transmission can be controlled also by two pressures acting on the primary ring wheel and the secondary sun wheel as in the embodiments described above. The control method according to the present disclosure can be applied as such on this transmission. The control systems shown in FIGS. 4 and 5 can be applied also as such to an RVT, wherein motor-pump assembly 20 is connected to the primary ring wheel and the motor-pump assembly 21 is connected to the secondary sun wheel or vice versa.

While the present disclosure has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for controlling a continuously variable transmission, wherein the continuously variable transmission comprises an input shaft and an output shaft being rotatably arranged about a common central rotation axis, a ring wheel and a sun wheel being coaxially arranged with respect to the central rotation axis, and at least one pivotable planet wheel, a pivot angle of the planet wheel determining a transmission ratio of the continuously variable transmission, wherein the method comprises:

operating the transmission through drill-free rolling of the at least one planet wheel on surfaces of the ring wheel and the sun wheel, independently of the pivot angle of the planet wheel, wherein the ring wheel, the at least one planet wheel, and the sun wheel are clamped together such that the ring wheel exerts a first normal force on the at least one planet wheel and the sun wheel exerts a second normal force on the at least one planet wheel; and controlling the first and second normal forces such that, when the continuously variable transmission operates at a given input speed, a given transmitted torque, and a given constant transmission ratio, a predefined static value of the first and second normal force is applied, such that a condition of microslip is applied to rolling contacts between the at least one planet wheel and the ring wheel and the sun wheel;

wherein, during a continuous increase or decrease of the pivot angle and thereby of the transmission ratio, any force component added to the static values of the first and the second normal forces is either zero or smaller than necessary to maintain the microslip condition.

2. The method according to claim 1, wherein during the increase or decrease of the transmission ratio, one of the normal forces is maintained at the static value while the other is controlled to overcome tangential reaction forces generated by a change of the pivot angle.

3. The method according to claim 1, wherein the ring wheel and the sun wheel are clamped together under a direct or indirect influence of a respective hydraulic pressure.

4. The method according to claim 3, wherein a first hydraulic pressure and a second hydraulic pressure act directly on respective hydraulic pistons moving axially in a direction of the central rotation axis, and wherein the ring wheel and the sun wheel are fixed to the respective hydraulic pistons.

5. A continuously variable transmission, comprising:
an input shaft and an output shaft being rotatably arranged about a common central rotation axis;
a ring wheel and a sun wheel being coaxially arranged with respect to the central rotation axis; and
at least one pivotable planet wheel, a pivot angle of the planet wheel determining a transmission ratio of the continuously variable transmission;
wherein the continuously variable transmission is configured to operate through drill-free rolling of the at least one planet wheel on the surfaces of the ring wheel and the sun wheel independently of the pivot angle of the at least one planet wheel;
wherein the ring wheel and the sun wheel are clamped together such that the ring wheel exerts a first normal force on any of the at least one planet wheel and the sun wheel exerts a second normal force on said planet wheel; and
wherein the continuously variable transmission comprises a control system configured to control the continuously variable transmission in accordance with the method of claim 1.

6. The continuously variable transmission according to claim 5, wherein the control system is a hydraulic control system.

7. The continuously variable transmission according to claim 6, further comprising a first and a second hydraulic cylinder configured to clamp the ring wheel and the sun wheel together by applying a first and a second hydraulic pressure on a hydraulic fluid comprised in the first and the second hydraulic cylinder respectively, wherein the hydraulic control system is configured to regulate the first and the second hydraulic pressure.

8. The continuously variable transmission according to claim 7, wherein the first and the second hydraulic pressure are configured to act directly on respective first and second pistons which are movable inside said respective first and second hydraulic cylinders.

9. The continuously variable transmission according to claim 7, wherein the control system comprises a first and a second motor and pump assembly, each of the first and second motor and pump assembly comprising a hydraulic pump coupled to an electric motor, said assemblies being configured to control said first and second hydraulic pressures in the respective first and second hydraulic cylinders.

10. The continuously variable transmission according to claim 9, wherein an output port of the hydraulic pump of one of the first and second motor and pump assembly is connected to an input port of the hydraulic pump of the other one of the first and second motor and pump assembly.

11. The continuously variable transmission according to claim 9, wherein the hydraulic pumps of the first and second motor and pump assemblies are configured to act as hydraulic motors, and wherein the electric motors of the first and second motor and pump assemblies are configured to act as generators.

12. The continuously variable transmission according to claim 5, wherein the at least one planet wheel comprises a set of at least two planet wheels.

13. The method of claim 1, wherein the at least one pivotable planet wheel comprises a set of at least two pivotable planet wheels.

14. A method for controlling a continuously variable transmission,
wherein the continuously variable transmission comprises an input shaft and an output shaft being rotatably arranged about a common central rotation axis, a ring wheel and a sun wheel being coaxially arranged with respect to the central rotation axis, and at least one pivotable planet wheel, a pivot angle of the planet wheel determining a transmission ratio of the continuously variable transmission,
wherein the method comprises:
operating the transmission through drill-free rolling of the at least one planet wheel on surfaces of the ring wheel and the sun wheel independently of the pivot angle of the planet wheel;
clamping together the ring wheel, the at least one planet wheel and the sun wheel such that the ring wheel exerts a first normal force on the at least one planet wheel and the sun wheel exerts a second normal force on said planet wheel;
operating the continuously variable transmission at a given input speed, a given transmitted torque and a given constant transmission ratio;
applying a predefined static value of the first and second normal force by controlling said first and second normal forces, such that a condition of microslip is applied to rolling contacts between the at least one planet wheel and the ring wheel and the sun wheel;
increasing or decreasing the pivot angle and thereby the transmission ratio; and
while increasing or decreasing the pivot angle, each of the first and the second normal force is either maintained at the respective predefined static value, or is adapted by adding a force component to the respective predefined static values, wherein the force component is smaller than necessary for the respective normal force to maintain the microslip condition.

* * * * *

UNITED STATES PATENT AND TRADEMARK OFFICE
CERTIFICATE OF CORRECTION

PATENT NO. : 11,913,544 B2
APPLICATION NO. : 17/907568
DATED : February 27, 2024
INVENTOR(S) : Filip De Maziere and Lucas Present It is certified that error appears in the above-identified patent and that said Letters Patent is hereby corrected as shown below:

In the Claims

Column 12, Line 48, Claim 14: "values" should read --value--.

Signed and Sealed this
Second Day of April, 2024

Katherine Kelly Vidal
Director of the United States Patent and Trademark Office